United States Patent [19]
Roth

[11] Patent Number: 4,595,029
[45] Date of Patent: Jun. 17, 1986

[54] ELECTRO-PNEUMATIC CONVERTER

[75] Inventor: Günther Roth, Solingen, Fed. Rep. of Germany

[73] Assignee: Sunvic Regler GmbH, Solingen, Fed. Rep. of Germany

[21] Appl. No.: 668,424

[22] Filed: Nov. 5, 1984

[30] Foreign Application Priority Data

Nov. 26, 1983 [DE] Fed. Rep. of Germany ....... 3342857

[51] Int. Cl.[4] .............................................. G05D 16/00

[52] U.S. Cl. ................................ 137/82; 251/129.08; 251/129.09

[58] Field of Search ............................ 137/82, 85, 86; 251/137, 129.08, 129.09

[56] References Cited

U.S. PATENT DOCUMENTS

| | | | |
|---|---|---|---|
| 2,750,960 | 6/1950 | Hansen | 251/137 X |
| 3,155,104 | 11/1904 | Hilgert | 251/137 X |
| 3,589,672 | 2/1969 | Hoolloman | 251/137 X |
| 3,621,862 | 11/1971 | Wojtecki | 137/82 |
| 4,336,819 | 6/1982 | Nishihara | 137/82 X |

*Primary Examiner*—Alan Cohan
*Attorney, Agent, or Firm*—Marshall, O'Toole, Gerstein, Murray & Bicknell

[57] ABSTRACT

Telescoping coil systems 14 and 16, respectively, engage a Z-shaped balance beam 12 at opposite arms 18 and 20 thereof said beam being mounted centrally by a flexural pivot suspension 10. A surface 26 is provided on the arm 18 and forms a nozzle and baffle plate system with nozzle 22. The torque caused by the pneumatic pressure acting on the surface of nozzle 22 is compensated for by a torque exerted by two telescoping coil systems 14 and 16 when an electrical current is passed through. Thereby the pressure at an output 28 is proportional to the electrical current. A flexural pivot suspension provided for the balance beam includes a pair of crossed baffle springs on each side of the balance beam. Each leaf spring has one end attached to the balance beam and the other end attached to a bearing portion.

8 Claims, 9 Drawing Figures

ELECTRO-PNEUMATIC CONVERTER

The invention relates to an electro-pneumatic converter for converting an electric current into a pneumatic pressure.

BACKGROUND OF THE INVENTION

In general, known electro-pneumatic converters include a two-armed balance beam mounted by a pivot bearing, a telescoping coil system engaging the balance beam, an electric current to be converted being applied to the coil in operation, and a nozzle connected to a pneumatic fluid source through a restrictor and arranged in front of a baffle plate surface of the balance beam to form a nozzle and baffle plate with the balance beam. The pressure ensuing at the nozzle acts on the baffle plate surface of the balance beam and counterbalances a torque exerted by the telescoping coil system on the balance beam due to the electric current.

In known electro-pneumatic converters (German Offenlegungsschrift No. 26 54 003, "Regelungstechnische Praxis" 22 (1980), 221 to 230, "Regelungstechnische Praxis" 23 (1981) 201 to 206 (FIG. 6) a balance beam is suspended easily rotatably by a flexural pivot. A telescoping coil is attached to the balance beam. The telescoping coil plunges into the air gap of a housing-fixed magnet. When a current is flowing through the telescoping coil, it is drawn into the magnet. Thereby it exerts a torque on the balance beam, which torque is proportional to the intensity of current. A nozzle is arranged in front of a surface of the balance beam and is connected to a pneumatic fluid source through a restrictor. This nozzle forms a nozzle and baffle plate with the balance beam. A pressure ensues at the nozzle, which pressure counterbalances a torque exerted by the telescoping coil system on the balance beam due to the electric current. This pressure can become effective on the balance beam through a diaphragm or a bellows. Compensation can, however, also be effected directly by the pressure in the nozzle. An equilibrium results in both cases.

The force on the telescoping coil system caused by the electric current to be converted is relatively small as compared to the force pneumatically exerted on the balance beam through a bellows or directly through the nozzle. Therefore, a relatively large mass, namely the telescoping coil, is necessarily located on a relatively large mass, namely while, on the other hand, a massless compensation takes place through a relatively small surface on a relatively small lever arm. To compensate for this imbalance of the masses, it is, therefore, usual to attach a counter-weight to the arm of the balance beam opposite to the telescoping coil, which counter-weight counterbalances the telescoping coil. The counter-weight is adjustable to be able to counterbalance other mass imbalances of the arrangement of the balance beam. This counter-weight does not contribute to the signal transmission. However, it deteriorates the dynamic transfer behavior of the electro-pneumatic converter. Therefore, conventional electro-pneumatic converters are susceptible to vibrations, that is, they have a tendency to oscillate, and are thus sensitive to shaking.

It is the object of the invention to reduce the susceptibility to vibrations and the sensitivity to shaking of an electro-pneumatic converter of the above defined type.

SUMMARY OF THE INVENTION

According to the invention, this object is achieved in that two telescoping coil systems are provided, with the electric current to be converted flowing through both coils and acting on one arm each of the balance beam with the same sense of rotation.

Two telescoping coils are provided in such an arrangement, such that the masses at the balance beam are balanced without requiring an additional counter weight. As the torque is exerted by two telescoping coil systems, each one of the telescoping coil systems can be made correspondingly smaller. Thereby, the oscillating masses as well as the dimensions of the electro-pneumatic converter are reduced. This results in a considerable reduction of the moment of inertia and thus a higher characteristic frequency, a reduced tendency to oscillate, and less sensitivity to shaking.

A flexural pivot suspension provided for the balance beam includes a pair of crossed baffle springs on each side of the balance beam. Each leaf spring has one end attached to the balance beam and the other end attached to a bearing portion.

BRIEF DESCRIPTION OF THE DRAWINGS

The features of this invention which are believed to be novel are set forth with particularity in the appended claims. The invention, together with its object and the advantages thereof, may be best understood by reference to the following description taken in conjunction with the accompanying drawings, in which like reference numerals identify like elements in the several figures and in which:

DETAILED DESCRIPTION OF THE DRAWINGS

Figure 1:
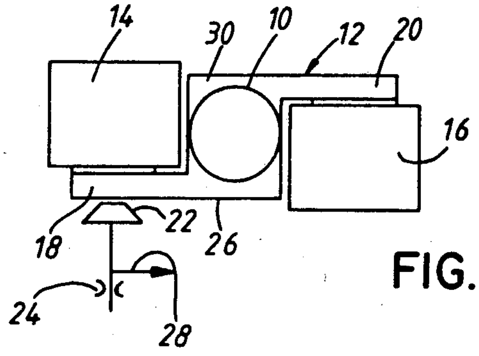
FIG. 1 shows substantially in full size a side elevational view (partially diagrammatic) of an electro-pneumatic converter having two telescoping coil systems.

Referring to FIG. 1, an electro-pneumatic converter in accordance with the invention includes a two-armed balance beam 12 mounted by a pivot bearing 10. Two telescoping coil systems 14 and 16 are provided, with an electric current to be converted flowing through both coil systems and each of which engages with the same sense of rotation one arm 18 and 20, respectively, of the balance beam. A nozzle 22 is arranged to be connected to a pneumatic fluid source (supply of air) through a restrictor 24 and is arranged in front of a surface 26 of the balance beam. The nozzle 22 forms a nozzle and baffle plate with the balance beam 12. The pressure ensuing at the nozzle 22 acts on the beam of balance 12 through the nozzle opening and counterbalances a torque exerted on the balance beam by the telescoping coil systems 14 and 16 due to the electric current. This pressure is proportional to the current flowing through the telescoping coil systems and is at an output 28.

In the illustrated arrangement, the two telescoping coil systems 14 and 16 are arranged on opposite sides of balance beam 12. Beam 12 is Z-shaped having a central portion 30 and two mutually parallel, offset arms 18 and 20. Telescoping coil systems 14 and 16 are arranged in the angles which are formed by the central portion 30 and one of the arms 18 and 20, respectively. Pivot bearing 10 is a flexural pivot suspension. In a way to be described hereinbelow, the flexural pivot suspension is rotatable relative to a base and to nozzle 22 for the zero adjustment.

Figure 2:
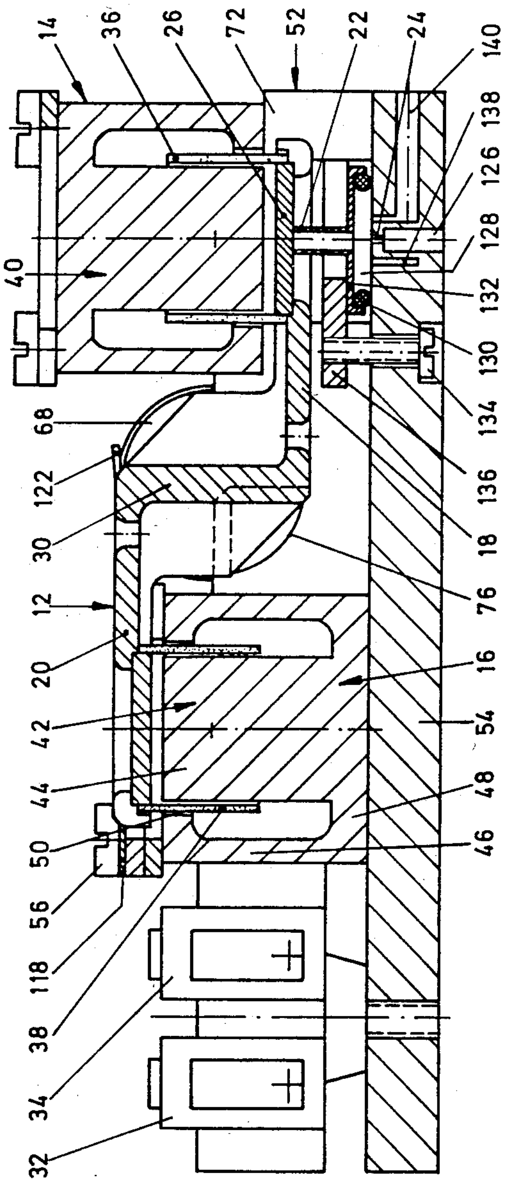
FIG. 2 shows a longitudinal sectional view of an electro-pneumatic converter at an enlarged scale.
Figure 3:
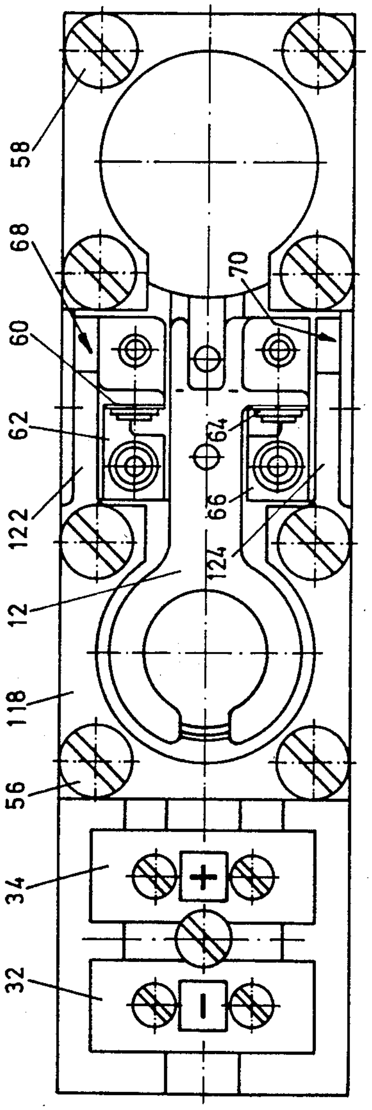
FIG. 3 shows a plan view of the electro-pneumatic converter.
Figure 5:
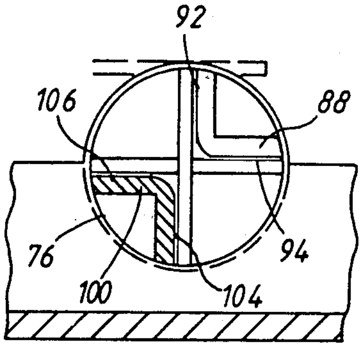
FIG. 5 shows a sectional view taken along line A–B of FIG. 4.
Figure 4:
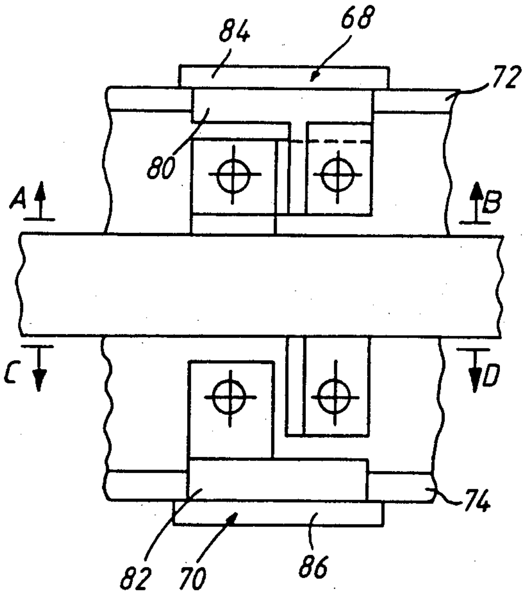
FIG. 4 shows a partial plan view of the flexural pivot suspension in the converter shown in FIGS. 2 and 3.
Figure 6:
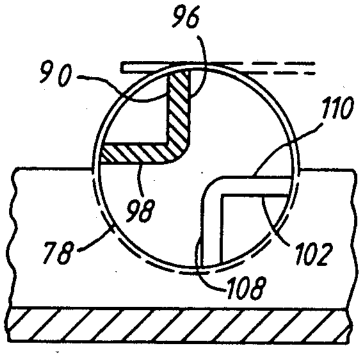
FIG. 6 shows a sectional view taken along line C–D of FIG. 4.

FIGS. 2 and 3 show the electro-pneumatic converter in detail at an enlarged scale. Numerals 32 and 34 designate connecting terminals, through which the electric current to be converted is supplied. The connecting terminals 32, 34 are connected through (not illustrated) flexible conductors to telescoping coils 36 and 38, respectively, of the telescoping coil systems 14 and 16, respectively. Each telescoping coil system 14 and 16 comprises a permanent magnet 40 and 42, respectively. Each permanent magnet 40, 42 comprises a cylindrical inner portion 44 and an outer portion 46 surrounding said inner portion 44 at a distance. The inner and outer portions 44 and 46 respectively, are interconnected through a bottom 48 and form an annular air gap 50 in which the telescoping coils 36 and 38, respectively, are axially movable. Magnets 40 and 42 are mounted on a base 52 having a base plate 54, each and are attached to base 52 by four screws 56 and 58, respectively. The flexural pivot suspension comprises two pairs of crossed leaf springs 60, 62 and 64, 66, respectively, on one side each of balance beam 12. Each leaf spring is attached with one end to a bearing portion 68 and 70, respectively, and with the other end to the balance beam. Bearing portions 68 and 70 are rotatably mounted on base 52. This can best be seen from FIGS. 4 to 6.

Base 52 consists of base plate 54 and side walls 72 and 74 having semicircular bearing cut-outs 76 and 78, respectively, on both sides of the balance beam 12. The bearing portions 68 and 70 are mounted with cylindrical bearing surfaces 80 and 82, respectively, in bearing cut-outs 76 and 78. Bearing portions 68 and 70 have projecting edges 84 and 86 respectively, on the outer sides, which engage the outer sides of side walls 72 and 74, respectively. Brackets 88 and 90, respectively, are formed on bearing portions 68 and 70 on the side facing balance beam 12. Brackets 88 and 90 have mutually orthogonal lateral surfaces 92, 94 and 96, 98, respectively. One leaf spring 60, 62 and 64, 66 respectively, is attached with one end to each of these mutually orthogonal lateral surfaces 92, 94 and 96, 98, respectively.

Figure 7:
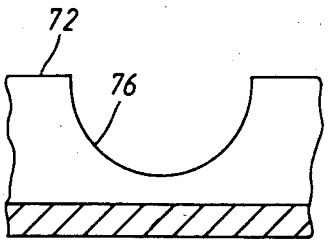
FIG. 7 shows the base plate and the side wall of the base of the converter, after the beam of balance with the flexural pivot suspension have been removed.
Figure 8:
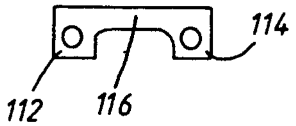
FIG. 8 shows a single leaf spring of the flexural pivot suspension.

Brackets 100, 102 are formed on balance beam 12 on both sides thereof. Brackets 100 and 102 also have mutually orthogonal lateral surfaces 104, 106 and 108, 110, respectively. One leaf spring 60, 62 and 64, 66, respectively, is attached with its other end to each of the mutually orthogonal lateral surfaces 104, 106 and 108, 110, respectively. As can be seen from FIG. 8, the leaf springs have enlarged ends 112, 114 for attachment and reduced central portions 116, such that, in the assembled state, the leaf springs, for example 60 and 62, extend around each other and the central portions 116 pass each other. In this way, the leaf springs form flexural pivots by means of which the balance beam is pivotably mounted.

Figure 9:
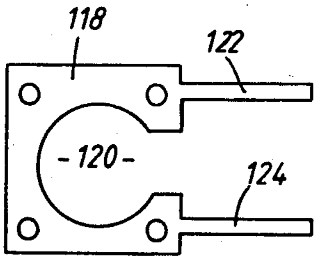
FIG. 9 shows a leaf spring or plate with tongues for clamping the bearing portions for the flexural pivot suspension.

Bearing portions 68, 70 with balance beam 12 are supported such as to permit removal from base 52. By rotating the bearing portions, the balance beam 12 can be biased in one or the other direction, whereby zero adjustment is possible. The bearing portions may be clamped in the adjusted position. This is done by a part 118 which is illustrated in FIG. 9. Part 118 is a spring sheet metal blank having two spring tongues 122, 124 and a central aperture 120 for the passage of telescoping coil 38 and balance beam 12. Spring sheet metal blank 118 engages magnet 42 and is attached to it by screws 56. Spring tongues 122 and 124 engage bearing surfaces 80 and 82, respectively, of bearing portions 68 and 70, respectively, on the side remote from bearing cut-outs 76, 78 and keep the bearing portions in their adjusted positions.

An air inlet port 126 is provided on the underside of base plate 54. Air inlet port 126 communicates with a chamber 128 through the restrictor 24. Chamber 128 is formed by an O-ring 130 and a plate 132. Nozzle 22 is provided in the plate and is formed by a straight piece of tube communicating with chamber 128. Nozzle 22 ends in front of surface 26 which here is formed by a support for the telescoping coil 36. Plate 132 is adjustably movable on O-ring 130 and can be adjusted by means of screws 134 and thrust pieces 136 extending over plate 132.

Chamber 128 communicates with a bore 140 in base plate 54 through an annular passage 138, which bore 140 represents outlet port 28 (FIG. 1).

It is to be noted that balance beam 12 is formed centrosymmetrically relative to the center of mass. This invention may also be utilized to form an electrohydraulic converter for converting an electric current into a hydraulic pressure.

What is claimed is:

1. In an electro-pneumatic converter for converting an electric current into a pneumatic pressure, including a two-armed balance beam mounted by a pivot bearing (10) on a base (52), a telescoping coil system (14) mounted on one arm of the balance beam (12) and adapted for connection to an electric current to be converted, a nozzle (22) adapted for connection to a pneumatic fluid source through a restrictor (24) and located in front of a surface (26) of the balance beam to form a nozzle and baffle plate with the balance beam, the pressure ensuing at the nozzle counterbalancing a torque on the balance beam exerted by the telescoping coil system due to the electric current, the improvement comprising a second telescoping coil system (16) mounted on the opposite arm of the balance beam and adapted for connection to the electric current to be converted so that each telescoping coil system (14, 16) acts on the respective arms of balance beam (12) with the same sense of rotation, wherein, (a) the beam of balance (12) is Z-shaped having a central portion (30) and two mutually parallel offset arms (18, 20) and (b) the telescoping coil systems (14, 16) are arranged in the angles which are formed by the central portion (30) and a respective one of the arms (18, 20).

2. An electro-pneumatic converter according to claim 1, wherein the pivot bearing is a flexural pivot suspension having crossed leaf springs (60, 62; 64, 66) and being rotatable relative to the base and to the nozzle.

3. An electro-pneumatic converter according to claim 2, wherein (a) the pivot bearing includes bearing portions (68, 70) rotatably mounted to the base, and (b) the flexural pivot suspension has a respective pair of crossed leaf springs (60, 62; 64, 66) on each side of the balance beam, each of said leaf springs being attached to the bearing portion at one spring end and to the balance beam at the other spring end.

4. An electro-pneumatic converter according to claim 3, including means for clamping the bearing portions (68, 70) in adjusted positions.

5. An electro-pneumatic converter according to claim 3, wherein (a) the base includes a base plate (54) with side walls (72, 74) having semicircular bearing cut-outs (76, 78) on both sides of the balance beam, (b) the bearing portions including cylindrical bearing surfaces (80, 82) mounted in the bearing cut-outs, and p1 (c) including releasable clamping members (122, 124) engaging the bearing surfaces of the bearing portions on a side remote from the bearing cut-outs for clamping the bearing portions in adjusted positions.

6. An electro-pneumatic converter according to claim 3, including (a) brackets (88, 90) formed on the bearing portions on a side facing the balance beam with mutually orthogonal lateral surfaces (92, 94; 96, 98), each leaf spring being attached at one spring end to a respective one of the mutually orthogonal lateral surfaces of said brackets, and (b) brackets (100, 102) formed on the balance beam on both sides thereof with mutually orthogonal lateral surfaces (104, 106; 108, 110), each leaf spring being attached at another spring end to a respective one of the mutually orthogonal lateral surfaces of said brackets.

7. An electro-pneumatic converter according to claim 6, wherein the leaf springs include enlarged ends (112, 114) for attachment and reduced central portions (116), such that, as assembled, the leaf springs extend around each other and the central portions pass each other.

8. An electro-pneumatic converter as set forth in claim 3, characterized in that the bearing portions with the balance beam are supported such as to be removable from the base.

* * * * *

UNITED STATES PATENT AND TRADEMARK OFFICE

CERTIFICATE OF CORRECTION

PATENT NO. : 4,595,029

DATED : June 17, 1986

INVENTOR(S) : Gunther Roth

It is certified that error appears in the above-identified patent and that said Letters Patent is hereby corrected as shown below:

Column 5, line 25, after the word "and", delete "Pl" and start a new paragraph beginning with "(c)".

Signed and Sealed this

*Ninth* Day of *September 1986*

[SEAL]

*Attest:*

DONALD J. QUIGG

*Attesting Officer* *Commissioner of Patents and Trademarks*